(12) United States Patent
Lee et al.

(10) Patent No.: US 7,268,458 B2
(45) Date of Patent: Sep. 11, 2007

(54) STATOR FOR ELECTRIC MOTOR

(75) Inventors: Ming Lee, Dong-Guan (CN); Yan-Jun Jia, Dong-Guan (CN)

(73) Assignee: Asia Optical Co., Inc., Taichung (TW)

( * ) Notice: Subject to any disclaimer, the term of this patent is extended or adjusted under 35 U.S.C. 154(b) by 152 days.

(21) Appl. No.: 11/172,723

(22) Filed: Jun. 30, 2005

(65) Prior Publication Data

US 2006/0055272 A1    Mar. 16, 2006

(51) Int. Cl.
*H02K 1/00* (2006.01)
(52) U.S. Cl. .......................................... 310/216; 310/71
(58) Field of Classification Search ................ 310/216, 310/71
See application file for complete search history.

(56) References Cited

U.S. PATENT DOCUMENTS 4,668,884 A * 5/1987 Amao et al. .............. 310/68 R

2004/0000830 A1 * 1/2004 Gomyo et al. .............. 310/179
2004/0140728 A1 * 7/2004 Dairi .......................... 310/217

FOREIGN PATENT DOCUMENTS

JP            03145949 A   *  6/1991

* cited by examiner

*Primary Examiner*—Darren Schuberg
*Assistant Examiner*—Hong-Vinh Nguyen
(74) *Attorney, Agent, or Firm*—Merchant & Gould P.C.

(57) ABSTRACT

A stator adapted for driving rotation of a rotor includes a stator body having a surrounding wall surface that surrounds a stator axis. A plurality of magnetic pole protrusions protrude radially from the surrounding wall surface relative to the stator axis, and a plurality of stator coils are respectively wound around the magnetic pole protrusions. A signal transmission unit is electrically coupled to the stator coils. Each of the magnetic pole protrusions has an outer periphery, and a recess formed inwardly from the outer periphery. Each of the stator coils has an inner conducting end that is accessible from the corresponding recess, thereby facilitating coupling of the inner conducting end to the signal transmission unit, and an outer conducting end electrically coupled to the signal transmission unit.

12 Claims, 6 Drawing Sheets

STATOR FOR ELECTRIC MOTOR

CROSS-REFERENCE TO RELATED APPLICATION

This application claims priority of Taiwanese Application No. 093128004, filed on Sep. 16, 2004.

BACKGROUND OF THE INVENTION

1. Field of the Invention

The present invention relates to an electric motor, more particularly to a stator for an electric motor.

2. Description of the Related Art

An electric motor includes the two basic elements of a stator and a rotor. By using a three-phase drive method, a rotating magnetic field is produced in the stator. A magnetic field of the rotor is established such that the rotor follows the rotating magnetic field of the stator.

FIG. 1 shows a conventional stator for a three-phase AC (alternating current) motor. The stator includes three windings 10 of differing large, medium, and small dimensions, and each formed into a closed sinusoidal shape. An adhesive is used to attach the windings 10 to one another such that the medium winding 10 is sleeved over the small winding 10, and the large winding 10 is sleeved over the medium winding 10. Each of the windings 10 has a winding start end and a winding finish end. The winding start ends of the windings 10 are electrically and respectively coupled to control lines (U, V, W), which are supplied with AC signals that are out of phase with one another. The winding finish ends of the windings 10 are electrically coupled to a common line (COM).

A drawback of the aforesaid conventional stator, however, is that manufacture of the same is difficult. In particular, not only is the formation of the sinusoidal shape of each of the windings 10 difficult, but each of the three windings 10 must be manufactured to precise dimensions to allow for the sleeved configuration described above. In addition, it is necessary that the sinusoidal shapes of the windings 10 be uniformly offset from each other so that the magnetic poles are uniformly distributed. Such offsetting to any high degree of accuracy is difficult to achieve. Finally, since each of the large, medium, and small windings 10 is individually and separately manufactured, complicated equipment is required for production of the stator.

SUMMARY OF THE INVENTION

The object of this invention is to provide a stator for an electric motor having a structure that is easy to manufacture and assemble, and in which magnetic poles thereof are uniformly distributed.

The stator of this invention is adapted for driving rotation of a rotor, and comprises: a stator body having a surrounding wall surface that surrounds a stator axis; a plurality of angularly displaced magnetic pole protrusions protruding radially from the surrounding wall surface relative to the stator axis; a plurality of stator coils respectively wound around the magnetic pole protrusions; and a signal transmission unit electrically coupled to the stator coils. Each of the magnetic pole protrusions has an outer periphery, and a recess formed inwardly from the outer periphery. Each of the stator coils has an inner conducting end that is accessible from the recess of the respective one of the magnetic pole protrusions, thereby facilitating coupling of the inner conducting end to the signal transmission unit, and an outer conducting end opposite to the inner conducting end and electrically coupled to the signal transmission unit.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 4:
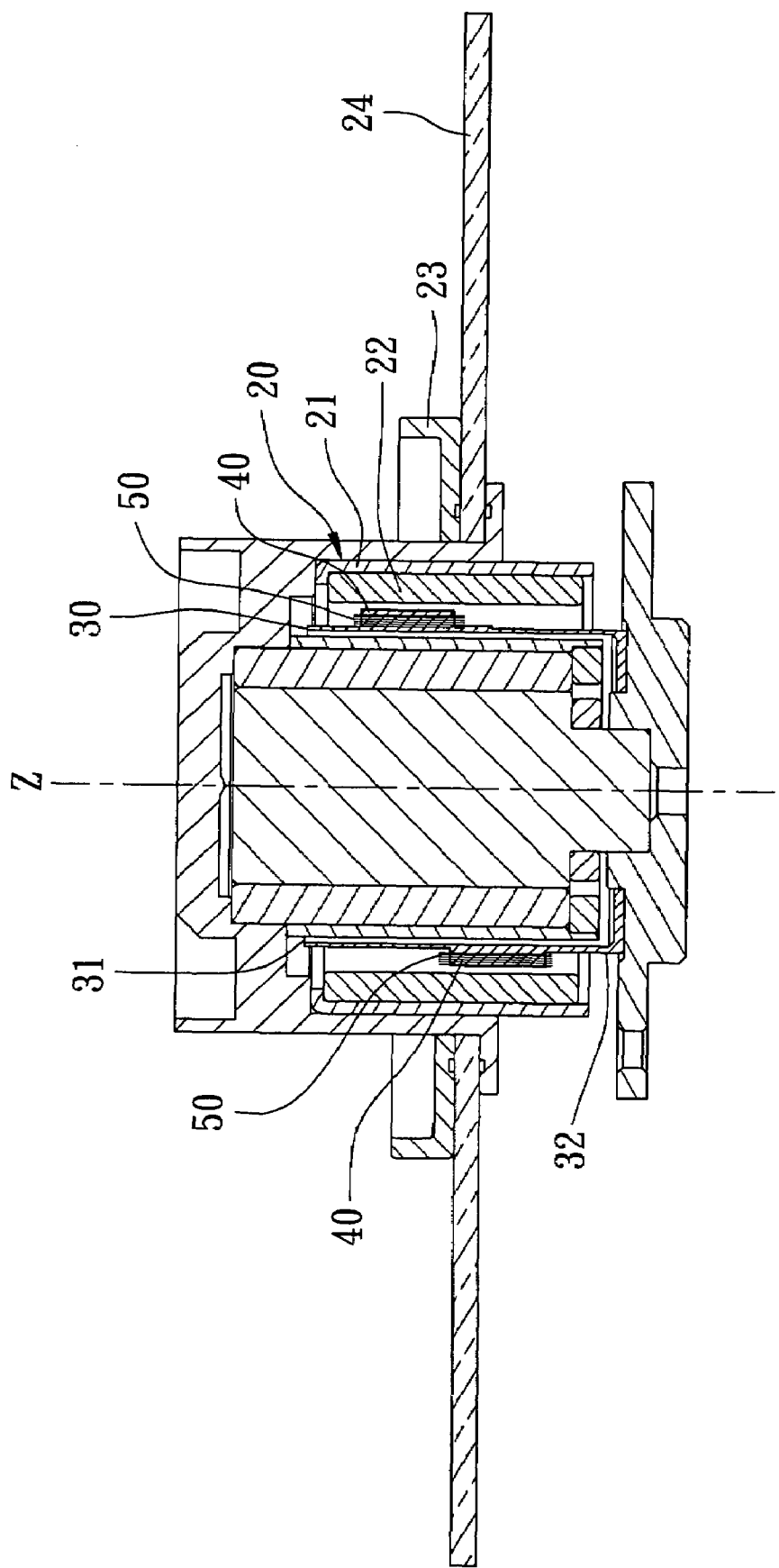
FIG. 4 is a sectional view of the stator of FIG. 2, and of a rotor and other elements mounted around the stator.
Figure 5:
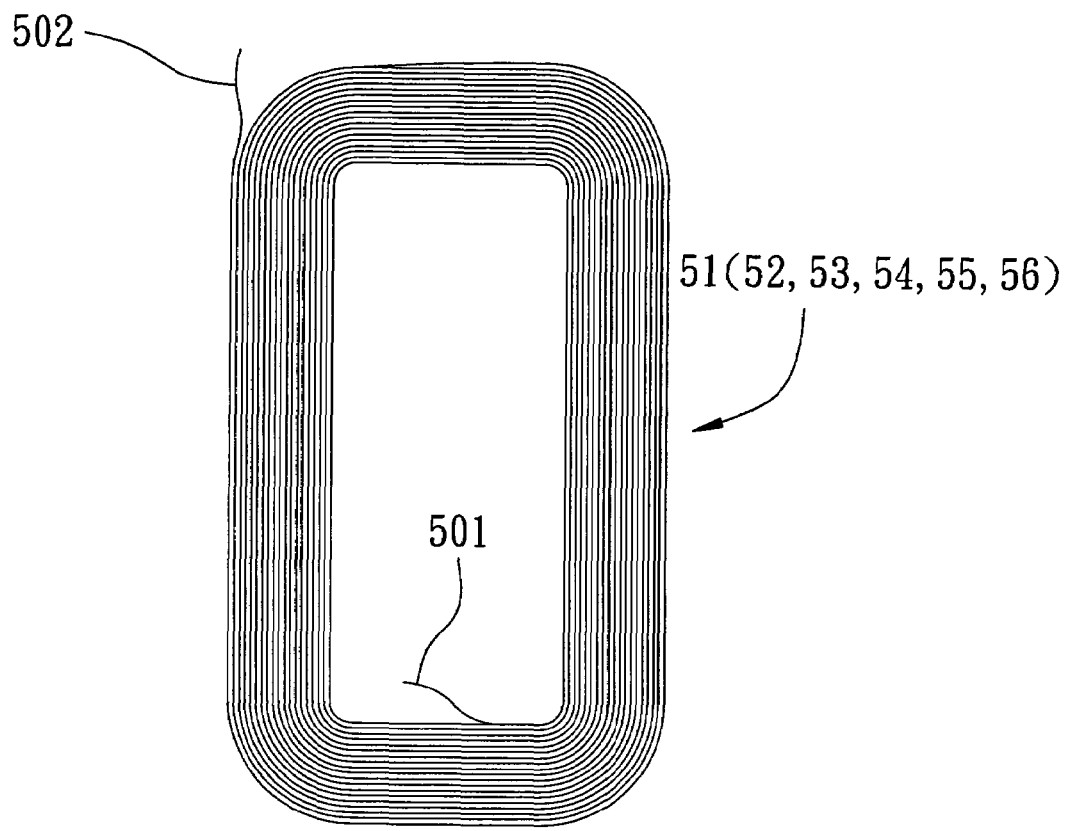
FIG. 5 is a plan view of a stator coil of the coil unit of FIG. 2.
Figure 6:
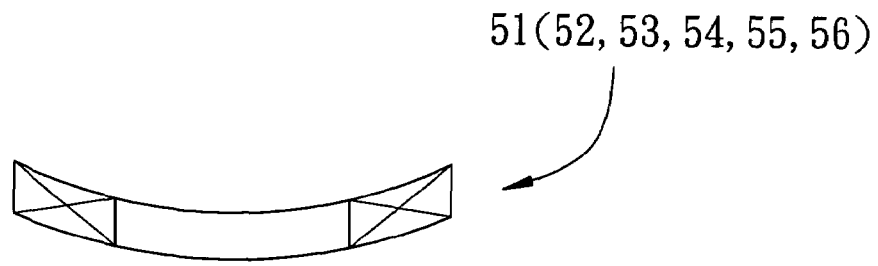
FIG. 6 is a sectional view of the stator coil of FIG. 5, illustrating a curvature in the stator coil.

A stator for an electric motor according to a preferred embodiment of the present invention is adapted for driving rotation of a rotor. Referring to FIG. 4, the rotor 20 includes an annular rotor body 21 surrounding a stator axis (Z), and a magnet unit 22 mounted on an inner surface of the rotor body 21. As an example of a specific application, a carrier 23 for a light filter 24 of an optical device may be fixed to an exterior of the rotor body 21.

Figure 2:
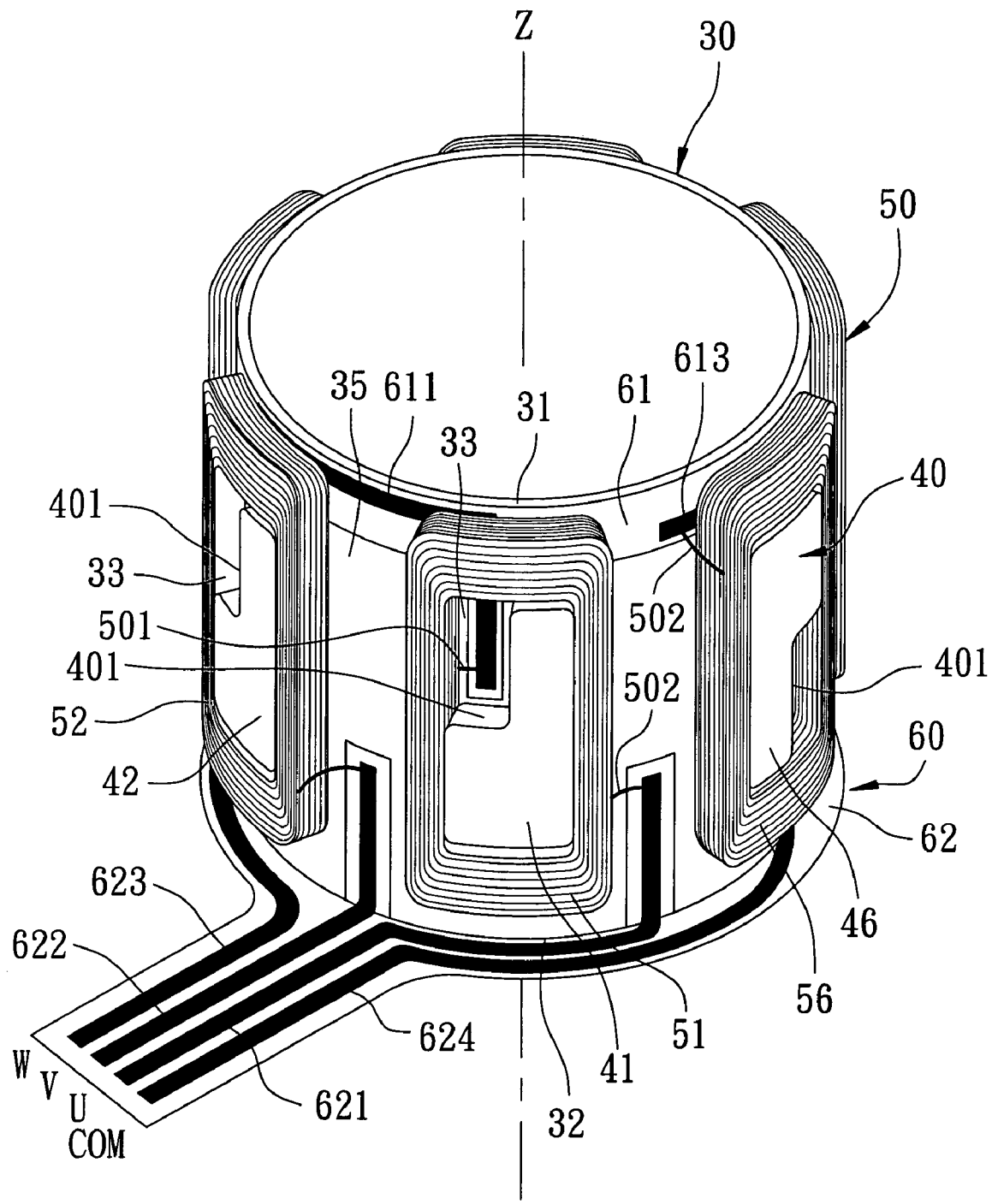
FIG. 2 is a perspective view of a stator for an electric motor according to a preferred embodiment of the present invention.
Figure 3:
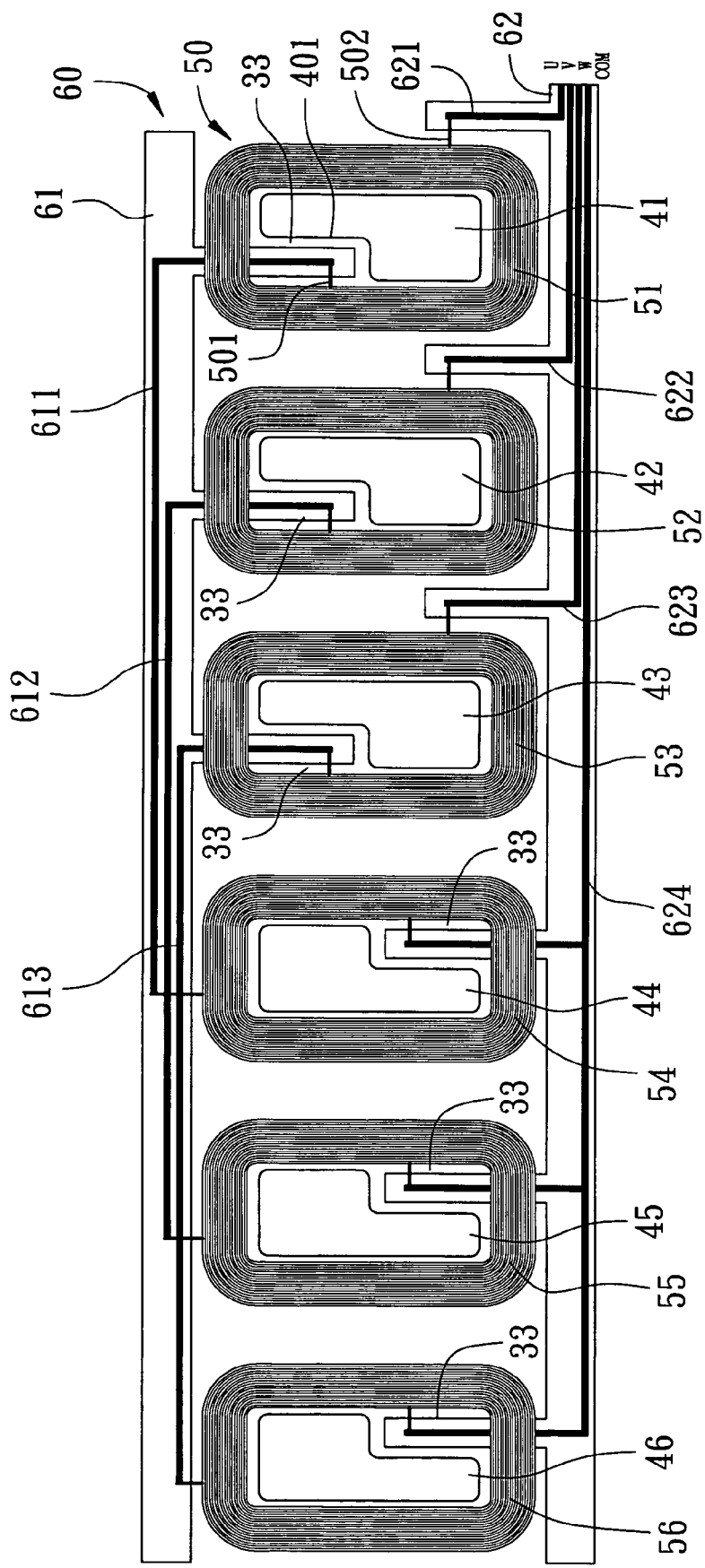
FIG. 3 is a perspective view of a signal transmission unit, a magnetic pole unit, and a coil unit of the stator of FIG. 2, illustrating these elements in a state where the stator is laid flat on a plane.

With further reference to FIGS. 2 and 3, the stator includes a stator body 30, a magnetic pole unit 40, a stator coil unit 50, and a signal transmission unit 60.

The stator body 30 has an outer surrounding wall surface 35 that surrounds the stator axis (Z) and has the rotor 20 disposed coaxially therearound. The stator body 30 includes a first axial end portion 31 and a second axial end portion 32 corresponding respectively to upper and lower axial end portions of the stator body 30.

The magnetic pole unit 40 is mounted on the surrounding wall surface 35 to confront the magnet unit 22 of the rotor 20. In the preferred embodiment, the magnetic pole unit 40 includes angularly displaced and consecutive first, second, third, fourth, fifth, and sixth magnetic pole protrusions 41, 42, 43, 44, 45, 46. The first through sixth magnetic pole protrusions 41-46 protrude radially outward from the surrounding wall surface 35 relative to the stator axis (Z).

Each of the first through sixth magnetic pole protrusions 41-46 includes a recess 401 formed in an outer periphery thereof. In the preferred embodiment, each of the first through sixth magnetic pole protrusions 41-46 is substantially quadrilateral having four corners, and each of the recesses 401 is formed in one corner area of the respective one of the magnetic pole protrusions 41-46. The recesses 401 of the first, second, and third magnetic pole protrusions 41, 42, 43 extend downwardly toward the second axial end portion 32 of the stator body 30, and the recesses 401 of the fourth, fifth, and sixth magnetic pole protrusions 44, 45, 46 extend upwardly toward the first axial end portion 31 of the stator body 30.

Referring to FIGS. 2, 3, 5, and 6, the stator coil unit 50 includes consecutive first, second, third, fourth, fifth, and sixth stator coils 51, 52, 53, 54, 55, 56 in the preferred embodiment. The first through sixth stator coils 51-56 are formed having a curved cross section (see FIG. 6) corresponding to a curvature in the surrounding wall surface 35 of the stator body 30.

The first through sixth stator coils 51-56 are respectively wound around the first through sixth magnetic pole protrusions 41-46. Each of the stator coils 51-56 includes an inner conducting end 501 extending from an inner periphery of the corresponding stator coil 51-56, and proximate to the recess 401 of the corresponding one of the first through sixth magnetic pole protrusions 41-46 so as to be accessible from the recess 401. Each of the stator coils 51-56 further includes an outer conducting end 502 extending from an outer periphery of the corresponding stator coil 51-56, and distal from the recess 401 of the corresponding one of the first through sixth magnetic pole protrusions 41-46.

The inner peripheries of the first through sixth stator coils 51-56, the recesses 401 of the first through sixth magnetic pole protrusions 41-46, and the surrounding wall surface 35 cooperatively define six connecting regions 33.

The signal transmission unit 60 is electrically coupled to the inner and outer conducting ends 501, 502 of the first through sixth stator coils 51-56 of the stator coil unit 50. The signal transmission unit 60 includes a first conducting member 61 for interconnecting electrically the first through sixth stator coils 51-56 in series and in pairs, and a second conducting member 62 for transmitting motor signals to paired ones of the first through sixth stator coils 51-56 and for providing return paths for the motor signals from the paired ones of the first through sixth stator coils 51-56. This will be described in greater detail below. In the preferred embodiment, the first and second conducting members 61, 62 are flexible printed circuits, and are mounted respectively on the surrounding wall surface 35 at the first and second axial end portions 31, 32 of the stator body 30.

Figure 7:
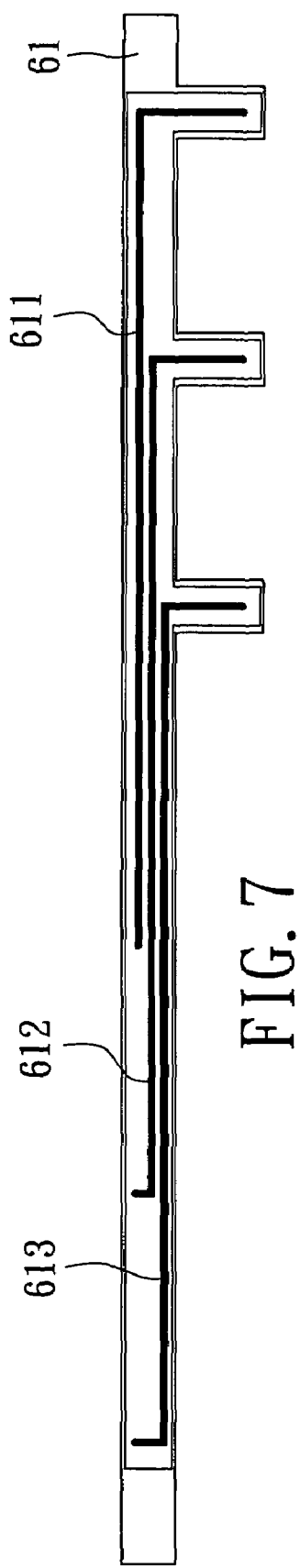
FIG. 7 is a schematic plan view of a first conducting member of the stator of FIG. 2.

Referring to FIGS. 2, 3, and 7, the first conducting member 61 is mounted on the first axial end portion 31 of the stator body 30. The first conducting member 61 includes a first conductor segment 611 electrically coupled to the first and fourth stator coils 51, 54, a second conductor segment 612 electrically coupled to the second and fifth stator coils 52, 55, and a third conductor segment 613 electrically coupled to the third and sixth stator coils 53, 56. In more detail, first ends of the first, second, and third conductor segments 611, 612, 613 extend into the recesses 401 of the first, second, and third magnetic pole protrusions 41, 42, 43 for connection to the inner conducting ends 501 of the first, second, and third stator coils 51, 52, 53, respectively, and second ends of the first, second, and third conductor segments 611, 612, 613 are connected to the outer conducting ends 502 of the fourth, fifth, and sixth stator coils 54, 55, 56, respectively.

Figure 8:
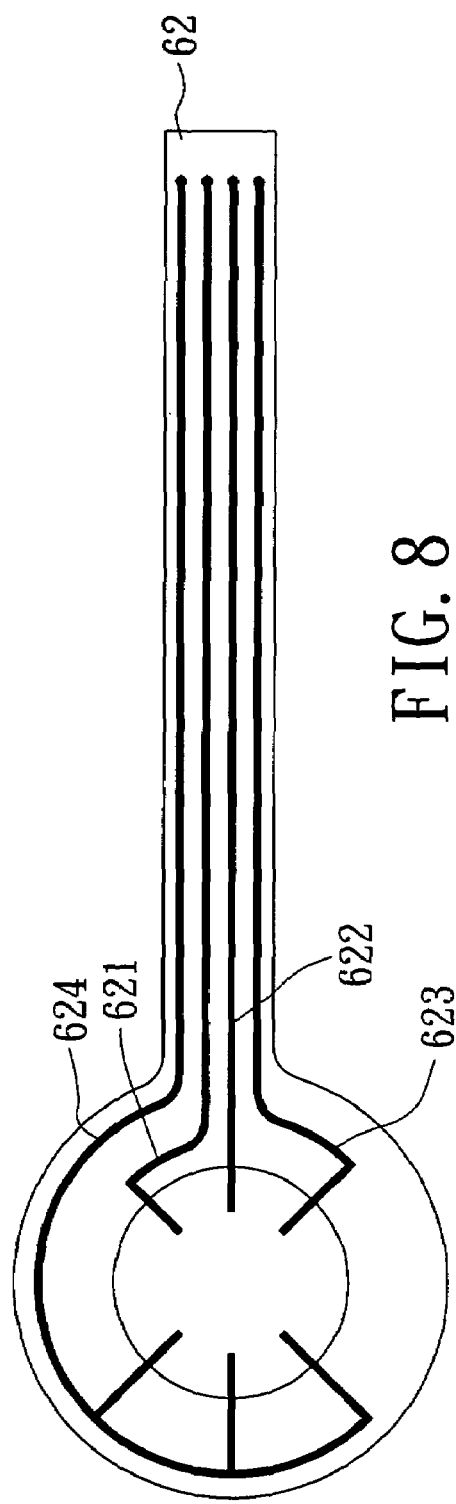
FIG. 8 is a schematic plan view of a second conducting member of the stator of FIG. 2.

Referring to FIGS. 2, 3, and 8, the second conducting member 62 is mounted on the second axial end portion 32 of the stator body 30. The second conducting member 62 includes a first control line 621 electrically coupled to the first stator coil 51, a second control line 622 electrically coupled to the second stator coil 52, a third control line 623 electrically coupled to the third stator coil 53, and a fourth control line 624 electrically coupled to the fourth, fifth, and sixth stator coils 54, 55, 56. In more detail, first ends of the first, second, and third control lines 621, 622, 623 are electrically coupled to the outer conducting ends 502 of the first, second, and third stator coils 51, 52, 53, respectively, and opposite second ends of the first, second, and third control lines 621, 622, 623 are connected to a signal generator (not shown) to receive motor signals U, V, W therefrom, respectively. Further, the fourth control line 624 includes a forked first end that extends into the recesses 401 of the fourth, fifth, and sixth magnetic pole protrusions 44, 45, 46 for electrical coupling to the inner conducting ends 501 of the fourth, fifth, and sixth stator coils 54, 55, 56. A second end of the fourth control line 624 forms a common terminal.

Referring to FIGS. 2, 3, and 4, the first stator coil 51, the fourth stator coil 54, the first conductor segment 611, the first control line 621, and the fourth control line 624 cooperate to form a first winding through a serial connection. The second stator coil 52, the fifth stator coil 55, the second conductor segment 612, the second control line 622, and the fourth control line 624 cooperate to form a second winding through a serial connection. Finally, the third stator coil 53, the sixth stator coil 56, the third conductor segment 613, the third control line 623, and the fourth control line 624 cooperate to form a third winding through a serial connection. The above three windings, together with the first and second conducting members 61, 62 and the signals associated therewith form a three-phase, four-line type control circuit.

When three-phase AC motor signals are respectively input to the three windings, the magnetic pole unit 40 generates varying magnetic poles such that by interaction with the magnet unit 22 of the rotor body 21, the rotor 20 is driven to rotate.

It is noted that the first through sixth magnetic pole protrusions 41-46 of the magnetic pole unit 40 and the first through sixth stator coils 51-56 of the stator coil unit 50 may be increased or decreased in number as needed. Further, the present invention is not limited to the connecting method of the signal transmission unit 60, or to the three-phase, four-line type control circuit as described above.

Figure 1:
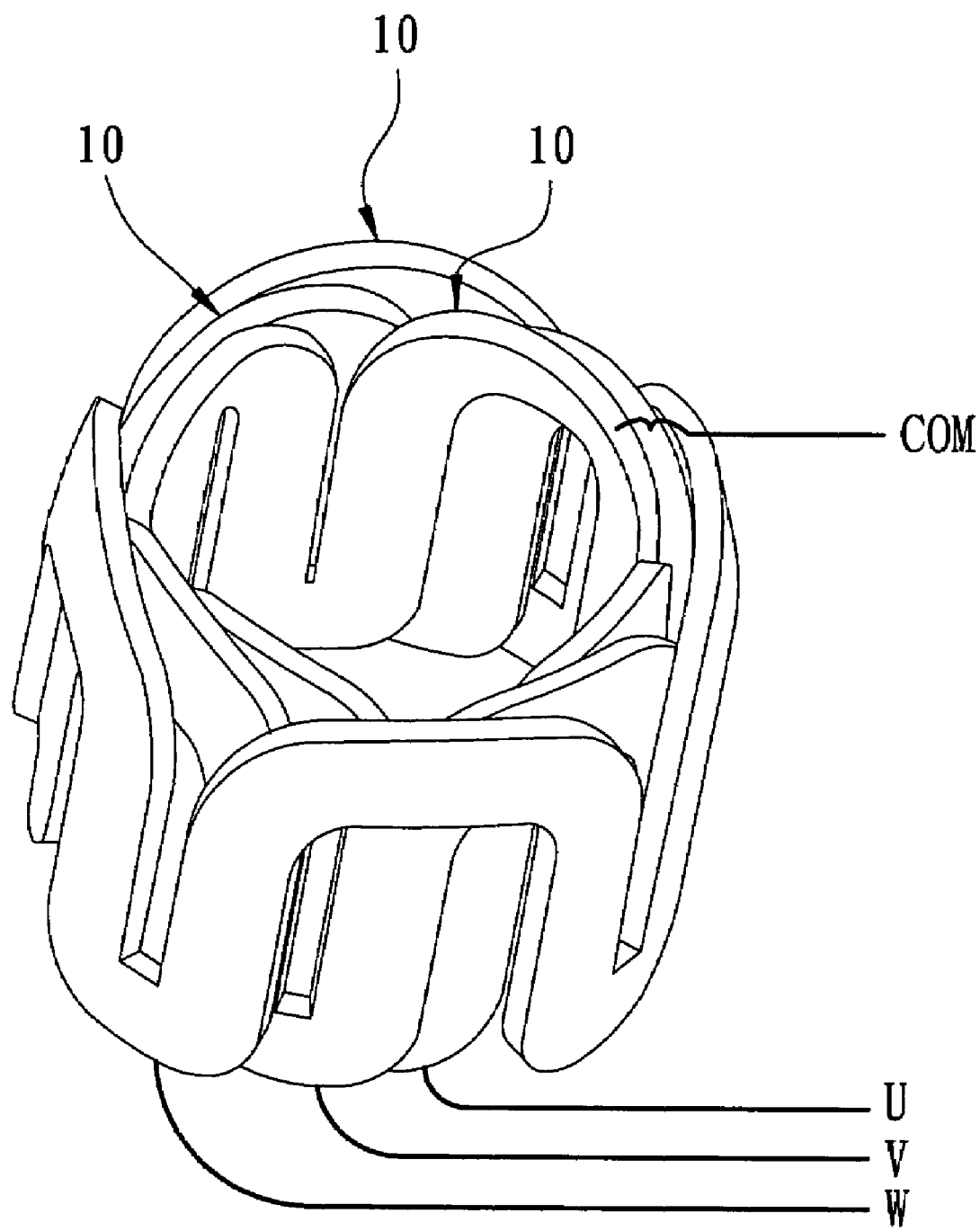
FIG. 1 is a perspective view of a conventional stator for an electric motor.

The stator of the present invention has many advantages over the prior art described hereinabove. First of all, the recesses 401 of the magnetic pole protrusions 41-46 provide spaces for easy wire connections. Further, since all like elements are dimensionally uniform and relatively simple in their configuration, the inventive structure allows for easy assembly, and hence, lends itself well to mass production. In addition, relatively simple processes are involved in ensuring that there is substantially equal spacing between adjacent ones of the first through sixth magnetic pole protrusions 41-46 (and therefore the first through sixth stator coils 51-56) to thereby result in equal distribution of magnetic poles. This is in contrast to the difficulties encountered when attempting to ensure uniform magnetic pole distribution with the prior art structure of FIG. 1.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

What is claimed is:

1. A stator adapted for driving rotation of a rotor, said stator comprising:
   a stator body having a surrounding wall surface that surrounds a stator axis;

a plurality of angularly displaced magnetic pole protrusions protruding radially from said surrounding wall surface relative to said stator axis, each of said magnetic pole protrusions having an outer periphery, two opposite axial ends, and two opposite radial ends, and further having a recess formed inwardly from said outer periphery and extending from one of said axial ends toward the other of said axial ends and further extending radially between said two radial ends;

a plurality of stator coils respectively wound around said magnetic pole protrusions; and a signal transmission unit electrically coupled to said stator coils;

wherein each of said stator coils has an inner conducting end that is accessible from said recess of the respective one of said magnetic pole protrusions, thereby facilitating coupling of said inner conducting end to said signal transmission unit, and an outer conducting end opposite to said inner conducting end and electrically coupled to said signal transmission unit.

2. The stator of claim 1, wherein each of said magnetic pole protrusions is substantially quadrilateral in shape and has four corners, said recess of each of said magnetic pole protrusions being formed in one of said corners of the respective one of said magnetic pole protrusions.

3. The stator of claim 1, wherein said magnetic pole protrusions include consecutive first, second, third, fourth, fifth, and sixth magnetic pole protrusions, and said stator coils include consecutive first, second, third, fourth, fifth, and sixth stator coils;

said stator body including opposite first and second axial end portions, said recesses of said first, second, and third magnetic pole protrusions extending inwardly toward said second axial end portion of said stator body, said recesses of said fourth, fifth, and sixth magnetic pole protrusions extending inwardly toward said first axial end portion of said stator body.

4. The stator of claim 3, wherein said signal transmission unit includes:

a first conducting member for interconnecting electrically said first through sixth stator coils in series and in pairs; and a second conducting member for transmitting motor signals to paired ones of said first through sixth stator coils and for providing return paths for the motor signals from said paired ones of said first through sixth stator coils.

5. The stator of claim 4, wherein said first conducting member is mounted on said first axial end portion of said stator body and includes a first conductor segment electrically coupled to said first and fourth stator coils, a second conductor segment electrically coupled to said second and fifth stator coils, and a third conductor segment electrically coupled to said third and sixth stator coils, each of said first, second, and third conductor segments having a first end extending into a corresponding one of said recesses of said first, second, and third magnetic pole protrusions for connection to said inner conducting end of the corresponding one of said first, second, and third stator coils, and a second end opposite to said first end and connected to said outer conducting end of the corresponding one of said fourth, fifth, and sixth stator coils.

6. The stator of claim 4, wherein said second conducting member is mounted on said second axial end portion of said stator body and includes a first control line electrically coupled to said first stator coil, a second control line electrically coupled to said second stator coil, a third control line electrically coupled to said third stator coil, and a fourth control line electrically coupled to said fourth, fifth, and sixth stator coils, each of said first, second, and third control lines having a first end electrically coupled to said outer conducting end of the corresponding one of said first, second, and third stator coils, and a second end opposite to said first end for receiving a corresponding one of the motor signals.

7. The stator of claim 6, wherein said fourth control line includes a forked first end extending into said recesses of said fourth, fifth, and sixth magnetic pole protrusions for electrical coupling to said inner conducting ends of said fourth, fifth, and sixth stator coils, and a second end opposite to said first end of said fourth control line and forming a common terminal.

8. The stator of claim 4, wherein said first conducting member and said second conducting member are flexible printed circuits, and are mounted on said first and second axial end portions of said stator body, respectively.

9. The stator of claim 1, wherein each of said stator coils is wound around the outer periphery of the respective one of said magnetic pole protrusions and surrounds said recess in the respective one of said magnetic pole protrusions.

10. The stator of claim 1, wherein each of said magnetic pole protrusions protrudes radially outward from said surrounding wall surface.

11. The stator of claim 1, wherein said signal transmission unit includes:

a first conducting member for interconnecting electrically said stator coils in series and in pairs; and a second conducting member for transmitting motor signals to paired ones of said stator coils and for providing return paths for the motor signals from said paired ones of said stator coils, said first and second conducting members being flexible printed circuits and mounted on said surrounding wall surface of said stator body, each of said first and second conducting members having a plurality of conductor segments, each of said conductor segments having an end extending into a corresponding one of said recesses of said magnetic pole protrusions for connection to said inner connecting end of a respective one of said stator coils.

12. The stator of claim 11, wherein said stator body includes opposite first and second axial end portions, said first and second conducting members being mounted respectively on said first and second axial end portions.

* * * * *